No. 868,929. PATENTED OCT. 22, 1907.
R. P. JACKSON.
ELECTRIC CONTROL SYSTEM.
APPLICATION FILED APR. 3, 1905.
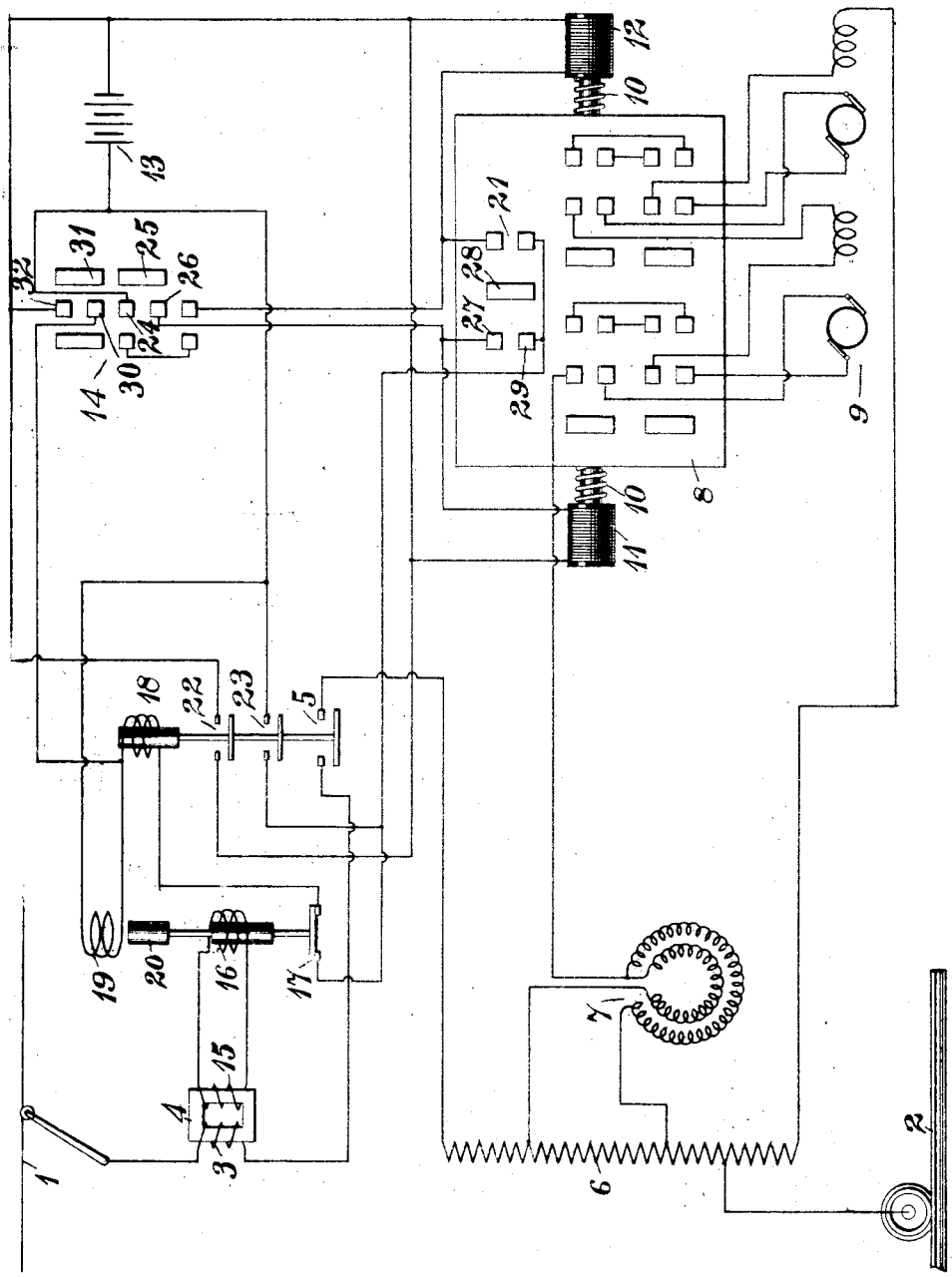
WITNESSES:
Fred H. Miller
R. J. Dearborn
INVENTOR
Ray P. Jackson
BY
Wesley J. Carr
ATTORNEY

UNITED STATES PATENT OFFICE.

RAY P. JACKSON, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC CONTROL SYSTEM.

No. 868,929.

Specification of Letters Patent.

Patented Oct. 22, 1907.

Application filed April 3, 1905. Serial No. 253,639.

*To all whom it may concern:*

Be it known that I, RAY P. JACKSON, a citizen of the United States, and a resident of Wilkinsburg, in the county of Allegheny and State of Pennsylvania, have invented a new and useful Improvement in Electric Control Systems, of which the following is a specification.

My invention relates to control systems for electric motors, and particularly to such systems as embody reversing switches and circuit-breakers.

The object of my invention is to provide a novel and improved means for retaining the reversing switch in closed circuit position, after it has been moved to that position, until after the circuit-breaker is opened.

My invention comprises a combination of devices and circuits which prevents the interruption of the motor circuits by the reversing switch and insures such interruption by the circuit-breaker, the contact terminals of which are generally much better adapted to withstand the destructive effects of arcing than are those of the reversing switch.

My invention consists in a novel combination and arrangement of connections and interlocking switches that are operated by a reversing switch and a circuit-breaker which enables the operating magnet windings to serve as retaining means when the reversing switch has been moved to its closed circuit positions and permits of the omission of retaining magnet windings.

The single figure of the accompanying drawing illustrates a system embodying my invention.

Alternating current electrical energy is supplied from a trolley conductor 1 and a track rail 2, through the primary winding 3 of a series transformer 4, a circuit-breaker 5, a main transformer 6, a voltage regulator 7 and a reversing switch 8, to motors 9.

The reversing switch is normally maintained in open-circuit position by means of springs 10 and is moved to its forward and reverse closed circuit positions, respectively, by means of operating magnet windings 11 and 12, which are supplied with energy from any suitable source, such, for example, as a battery 13, and the circuits of which are controlled by means of a master switch 14.

The secondary winding 15 of the series transformer 4 is connected in series with the operating magnet winding 16 of an overload relay switch 17 that is connected in circuit with the operating magnet winding 18 of the circuit-breaker 5 and interrupts the supply of energy thereto when the current delivered to the motors exceeds a predetermined amount. The relay switch 17 is also provided with a retaining magnet winding 19 and a core 20 and is moved into the field of the winding 19 when the relay switch is opened, these means serving to prevent the relay switch from being again closed until the master switch has been returned to its "off" position.

Mounted upon the reversing switch 8 and operated thereby, is an interlocking switch 21 that serves primarily to prevent energizing of the operating magnet winding 18 of the circuit-breaker 5 until after the reversing switch 8 has been moved to one of its closed circuit positions, and it also serves to complete circuits through the one or the other of the operating magnet windings of the reversing switch independently of the master switch 14. Interlocking switches 22 and 23, that are operated by the circuit-breaker 5 and are closed only when the circuit-breaker is closed, are the final means for controlling the circuits of the operating magnet windings 11 and 12 and for preventing the reversing switch from returning to its "off" position from one of its closed circuit positions until after the circuit-breaker 5 is opened.

When the master switch is moved to the left, a battery circuit is established through finger 24, drum segment 25 and finger 26 of the master switch 14, and operating magnet winding 11. The reversing switch 8 is then moved to the left and a battery circuit is established through contact finger 24, drum segment 25, contact fingers 26 and 27, conducting segment 28, contact finger 29, relay switch 17, circuit-breaker operating winding 18, contact finger 30, conducting segment 31 and contact finger 32.

The circuit-breaker 5 and interlocking switches 22 and 23 now close and a battery circuit independent of that before established through the master switch 14 is now established through interlocking switch 23, finger 29, conducting segment 28, finger 27, magnet winding 11 and interlocking switch 22.

If the master switch 14 is returned to its "off" position, the circuit of the operating magnet winding 18 of the circuit-breaker 5 is interrupted and the circuit-breaker opens, but the circuit of the operating magnet winding 11 is not opened when the master switch is returned to its "off" position until after the circuit-breaker is opened.

If more than a predetermined amount of current traverses the series transformer 4, the relay switch 17 is opened and the circuit of the operating magnet winding 18 is interrupted, thereby allowing the circuit-breaker 5 to open. When the core 20 is brought into the field of the magnet winding 19, it is retained in that position until the circuit of the winding 19 is interrupted by returning the master switch 14 to its "off" position, and it is therefore impossible to again supply current to the motors 9 until this movement of the master switch takes place.

While I have shown and described my invention as applied to an alternating current system of control and distribution, it is of course understood that it may be embodied in systems for the control of motors that are operated by means of direct current.

Certain other of the details of construction and arrangement may be modified, within limits, without departing from the invention.

I claim as my invention:

1. The combination with a source of energy, a translating device, a circuit-breaker to connect the translating device to said source, a reversing switch and operating magnet windings therefor, of means for causing the said windings to retain the reversing switch in closed circuit position until the circuit-breaker has opened.

2. The combination with a source of energy, a translating device, a circuit-breaker to connect the translating device to said source, a reversing switch and operating magnet windings therefor, of switches which maintain a closed circuit through the one or the other of said windings until the circuit-breaker has opened.

3. The combination with a translating device, a circuit-breaker, a reversing switch and operating magnet windings therefor, of switches operated by the circuit-breaker for connecting the one or the other of said windings in an energizing circuit while the circuit-breaker is closed.

4. The combination with a translating device, a circuit-breaker, a reversing switch and operating magnets therefor, of an interlocking switch operated by the reversing switch to insure retention of the reversing switch in closed position until after the circuit-breaker opens.

5. The combination with a translating device, a circuit-breaker, a reversing switch and operating magnets therefor, of two interlocking switches that are respectively operated by the reversing switch and by the circuit-breaker to insure retention of the reversing switch in its closed position until after the circuit-breaker opens.

6. The combination with a translating device, a circuit-breaker, a reversing switch and operating magnets therefor, of two interlocking switches one of which is opened and closed directly by the circuit-breaker and the other of which is opened and closed directly by the reversing switch.

7. The combination with a source of energy, a translating device, a circuit-breaker to connect the translating device to said source, a reversing switch and operating magnets therefor, of an auxiliary source of current, a master switch and means for maintaining the reversing switch in closed position until after the circuit-breaker opens.

8. The combination with a translating device and means for supplying variable voltage energy thereto, of a circuit-breaker, a reversing switch provided with operating magnets, an auxiliary source of energy and two interlocking switches that are respectively operated by the circuit-breaker and the reversing switch.

9. The combination with a translating device and means for supplying variable voltage energy thereto, of a circuit-breaker, a reversing switch provided with operating magnets, a master switch for making and breaking the circuit of either of said magnets, and interlocking switches for maintaining the circuit of the energized magnet until after the circuit-breaker opens.

10. The combination with a translating device and means for supplying energy thereto, of a circuit-breaker, a reversing switch provided with operating magnets, a master switch for closing the circuit of either of said magnets and opening that of the other, and means for maintaining the circuit of the energized magnet until after the circuit-breaker opens.

11. The combination with a source of energy, a translating device, a circuit-breaker to connect the translating device to said source, a reversing switch, and operating means therefor, of means for preventing movement of the reversing switch to open-circuit position until after the circuit-breaker opens.

12. The combination with a translating device, of a circuit-breaker to connect the translating device to said source, a reversing switch, means for operating said reversing switch, and means for preventing movement of the reversing switch to open-circuit position until after the circuit-breaker opens.

In testimony whereof, I have hereunto subscribed my name this 31st day of March, 1905.

RAY P. JACKSON.

Witnesses:
F. E. WYNNE,
BIRNEY HINES.